US012180656B2

(12) United States Patent
Sealey, II et al.

(10) Patent No.: US 12,180,656 B2
(45) Date of Patent: Dec. 31, 2024

(54) SYSTEMS AND METHODS FOR APPLICATION OF SURFACE CHEMISTRY TO BATH TISSUE, FACIAL TISSUE, AND PAPER TOWEL

(71) Applicant: First Quality Tissue, LLC, Great Neck, NY (US)

(72) Inventors: James E. Sealey, II, Belton, SC (US); Kevin Brennan, Anderson, SC (US); Justin S. Pence, Williamston, SC (US); Byrd Tyler Miller, IV, Easley, SC (US); Matthew John Walkiewicz, Anderson, SC (US)

(73) Assignee: First Quality Tissue, LLC, Great Neck, NY (US)

( * ) Notice: Subject to any disclaimer, the term of this patent is extended or adjusted under 35 U.S.C. 154(b) by 0 days.

(21) Appl. No.: 17/484,065

(22) Filed: Sep. 24, 2021

(65) Prior Publication Data

US 2022/0090326 A1 Mar. 24, 2022

Related U.S. Application Data

(60) Provisional application No. 63/082,516, filed on Sep. 24, 2020.

(51) Int. Cl.

| | |
|---|---|
| ***D21H 27/00*** | (2006.01) |
| ***B05D 3/14*** | (2006.01) |
| ***D21H 17/06*** | (2006.01) |
| ***D21H 21/24*** | (2006.01) |

(52) U.S. Cl.
CPC ............. *D21H 27/007* (2013.01); *B05D 3/14* (2013.01); *D21H 17/06* (2013.01); *D21H 21/24* (2013.01)

(58) Field of Classification Search
CPC .... D21H 27/002; D21H 27/005; D21H 19/12; D21H 19/72; D21H 21/20; D21H 27/007; D21H 27/008; D21H 27/02; D21H 17/06; D21H 21/24; B05D 2203/22; B05D 3/14; A47K 10/16
See application file for complete search history.

(56) References Cited

U.S. PATENT DOCUMENTS 3,994,771 A 11/1976 Morgan et al.
4,056,654 A * 11/1977 Kompanek ............. C04B 41/85 29/25.35
4,102,737 A 7/1978 Morton
4,191,609 A 3/1980 Trokhan
(Continued)

FOREIGN PATENT DOCUMENTS

EP 1849914 A1 * 10/2007 ............. B65H 37/00
JP 6600510 B2 * 10/2019
(Continued)

OTHER PUBLICATIONS

Micro Piezo. (Year: 2013).*
Yankee Dryer and Drying, A TAPPI Press Anthology, 1993, p. 215-219.

*Primary Examiner* — Jose A Fortuna
(74) *Attorney, Agent, or Firm* — Amster, Rothstein & Ebenstein LLP

(57) ABSTRACT

A method of producing wet laid disposable bath tissue, facial tissue, and paper towel with enhanced properties through application of surface additives using a piezoelectrical apparatus or application device.

13 Claims, 3 Drawing Sheets

(56) References Cited

U.S. PATENT DOCUMENTS

| | | | | |
|---|---|---|---|---|
| 4,351,699 | A | 9/1982 | Osborn | |
| 4,441,962 | A | 4/1984 | Osborn | |
| 4,529,480 | A | 7/1985 | Trokhan | |
| 4,637,859 | A | 1/1987 | Trokhan | |
| 4,799,378 | A * | 1/1989 | Portman, Jr. | G01G 19/64 73/54.27 |
| 4,940,513 | A | 7/1990 | Spendel | |
| 5,240,562 | A | 8/1993 | Phan et al. | |
| 5,246,545 | A | 9/1993 | Ampulski et al. | |
| 5,264,082 | A | 11/1993 | Phan et al. | |
| 5,334,286 | A | 8/1994 | Van Phan et al. | |
| 5,354,425 | A | 10/1994 | Mackey et al. | |
| 5,385,642 | A | 1/1995 | Van Phan et al. | |
| 5,405,501 | A | 4/1995 | Phan et al. | |
| 5,437,766 | A | 8/1995 | Van Phan et al. | |
| 5,494,731 | A | 2/1996 | Fereshtehkhou et al. | |
| 5,510,000 | A | 4/1996 | Phan et al. | |
| 5,510,002 | A | 4/1996 | Hermans et al. | |
| 5,525,345 | A | 6/1996 | Warner et al. | |
| 5,527,560 | A | 6/1996 | Fereshtehkhou et al. | |
| 5,575,891 | A | 11/1996 | Trokhan et al. | |
| 5,607,551 | A | 3/1997 | Farrington et al. | |
| 5,624,532 | A | 4/1997 | Trokhan et al. | |
| 5,624,676 | A | 4/1997 | Mackey et al. | |
| 5,698,076 | A | 12/1997 | Phan et al. | |
| 5,705,164 | A | 1/1998 | Mackey et al. | |
| 5,716,692 | A | 2/1998 | Warner et al. | |
| 5,814,188 | A | 9/1998 | Vinson et al. | |
| 5,830,487 | A | 11/1998 | Klofta et al. | |
| 5,846,380 | A | 12/1998 | Van Phan et al. | |
| 5,981,044 | A | 11/1999 | Phan et al. | |
| 6,162,329 | A | 12/2000 | Vinson et al. | |
| 6,179,961 | B1 | 1/2001 | Ficke et al. | |
| 6,238,682 | B1 | 5/2001 | Klofta et al. | |
| 6,261,580 | B1 | 7/2001 | Lehrter et al. | |
| 6,313,569 | B1 * | 11/2001 | Sawai | H03H 9/56 310/366 |
| 6,558,513 | B1 * | 5/2003 | Pease | C08F 10/10 162/173 |
| 6,579,416 | B1 | 6/2003 | Vinson et al. | |
| 6,604,267 | B2 * | 8/2003 | Sawai | H03H 9/56 29/25.35 |
| 6,607,637 | B1 | 8/2003 | Vinson et al. | |
| 6,797,117 | B1 | 9/2004 | McKay et al. | |
| 6,821,391 | B2 | 11/2004 | Scherb et al. | |
| 7,339,378 | B2 | 3/2008 | Han et al. | |
| 7,351,307 | B2 | 4/2008 | Scherb et al. | |
| 7,387,706 | B2 | 6/2008 | Herman et al. | |
| 7,432,309 | B2 | 10/2008 | Vinson | |
| 7,442,278 | B2 | 10/2008 | Murray et al. | |
| 7,476,293 | B2 | 1/2009 | Herman et al. | |
| 7,494,563 | B2 | 2/2009 | Edwards et al. | |
| 7,510,631 | B2 | 3/2009 | Scherb et al. | |
| 7,582,187 | B2 | 9/2009 | Scherb et al. | |
| 7,686,923 | B2 | 3/2010 | Scherb et al. | |
| 7,691,230 | B2 | 4/2010 | Scherb et al. | |
| 7,744,726 | B2 | 6/2010 | Scherb et al. | |
| 7,771,566 | B2 | 8/2010 | Hilbig et al. | |
| 7,811,418 | B2 | 10/2010 | Klerelid et al. | |
| 7,887,673 | B2 | 2/2011 | Andersson et al. | |
| 7,905,989 | B2 | 3/2011 | Scherb et al. | |
| 7,931,781 | B2 | 4/2011 | Scherb et al. | |
| 7,951,269 | B2 | 5/2011 | Herman et al. | |
| 8,075,739 | B2 | 12/2011 | Scherb et al. | |
| 8,092,652 | B2 | 1/2012 | Scherb et al. | |
| 8,118,979 | B2 | 2/2012 | Herman et al. | |
| 8,196,314 | B2 | 6/2012 | Munch | |
| 8,382,956 | B2 | 2/2013 | Boechat et al. | |
| 8,402,673 | B2 | 3/2013 | Da Silva et al. | |
| 8,435,384 | B2 | 5/2013 | Da Silva et al. | |
| 8,440,055 | B2 | 5/2013 | Scherb et al. | |
| 8,544,184 | B2 | 10/2013 | Da Silva et al. | |
| 8,580,083 | B2 | 11/2013 | Boechat et al. | |
| 9,033,473 | B2 * | 5/2015 | Yoshida | B41J 2/1632 347/68 |
| 9,878,538 | B2 * | 1/2018 | Yazaki | B41J 2/1632 |
| 9,994,021 | B2 * | 6/2018 | Yazaki | B41J 2/14233 |
| 10,156,490 | B2 * | 12/2018 | Singh | B05D 1/12 |
| 10,808,324 | B2 * | 10/2020 | Singh | B05B 7/1626 |
| 11,276,812 | B2 * | 3/2022 | Akimoto | H01L 41/0477 |
| 2008/0156450 | A1 | 7/2008 | Klerelid et al. | |
| 2010/0065234 | A1 | 3/2010 | Klerelid et al. | |
| 2011/0180223 | A1 | 7/2011 | Klerelid et al. | |
| 2016/0184494 | A1 * | 6/2016 | Hossainy | B05D 3/14 427/2.1 |
| 2018/0111373 | A1 * | 4/2018 | Yazaki | B41J 2/1612 |
| 2018/0187373 | A1 * | 7/2018 | Bomstad | D21H 19/68 |
| 2019/0120711 | A1 * | 4/2019 | Singh | G01L 9/06 |
| 2019/0252596 | A1 * | 8/2019 | Akimoto | H01L 41/1132 |
| 2020/0277737 | A1 * | 9/2020 | Weisang | D21H 27/002 |
| 2021/0213177 | A1 * | 7/2021 | Cho | A61L 29/16 |
| 2022/0090326 | A1 * | 3/2022 | Sealey, II | D21H 27/002 |
| 2022/0232328 | A1 * | 7/2022 | Mawatari | H04R 31/006 |
| 2022/0263009 | A1 * | 8/2022 | Mazzalai | C23C 14/3464 |
| 2023/0076265 | A1 * | 3/2023 | Peters | H10N 30/098 |

FOREIGN PATENT DOCUMENTS

| | | | | |
|---|---|---|---|---|
| WO | WO-2008047144 | A1 * | 4/2008 | H01L 51/0011 |
| WO | 2009067079 | A1 | 5/2009 | |
| WO | WO-2019077639 | A1 * | 4/2019 | B26D 7/1863 |
| WO | WO-2021013660 | A1 * | 1/2021 | C01B 21/0602 |

* cited by examiner

SYSTEMS AND METHODS FOR APPLICATION OF SURFACE CHEMISTRY TO BATH TISSUE, FACIAL TISSUE, AND PAPER TOWEL

RELATED APPLICATION

This application claims priority to and the benefit of U.S. Provisional Application No. 63/082,516, filed Sep. 24, 2020 and entitled SYSTEMS AND METHODS FOR APPLICATION OF SURFACE CHEMISTRY TO BATH TISSUE, FACIAL TISSUE, AND PAPER TOWEL, the contents of which are incorporated herein by reference in their entirety.

FIELD OF THE INVENTION

The present invention relates to a method of producing wet laid disposable bath tissue, facial tissue, and paper towel with enhanced properties through application of surface additives using a piezoelectrical apparatus.

BACKGROUND

The industrial methods or technologies used to produce disposable bath tissue, facial tissue, and paper towel are numerous. The technologies that use water to form the cellulosic (or other natural or synthetic fiber type) webs that comprise the disposable bath tissue, facial tissue, and paper towel are called Water-Laid Technologies. These include Through Air Drying (TAD), Uncreped Through Air Drying (UCTAD), Conventional Wet Crepe (CWC), Conventional Dry Crepe (CDC), ATMOS, NTT, QRT and ETAD. Technologies that use air to form the webs are called Air-Laid Technologies.

The Water-Laid technologies of Conventional Dry and Wet Crepe are the predominant methods to make disposable bath tissue, facial tissue, and paper towel. These methods include steps of forming a nascent web in a forming structure, transferring the web to a dewatering felt where it is pressed to remove moisture, and adhering the web to a Yankee Dryer. The web is then dried and creped from the Yankee Dryer and reeled. When creped at a solids content of less than 90%, the process is referred to as Conventional Wet Crepe. When creped at a solids content of greater than 90%, the process is referred to as Conventional Dry Crepe. These processes can be further understood by reviewing Yankee Dryer and Drying, A TAPPI PRESS Anthology, pg 215-219 which is herein incorporated by reference. These methods are well understood and easy to operate at high speeds and production rates. Energy consumption per ton is low since nearly half of the water removed from the web is through drainage and mechanical pressing. Unfortunately, the sheet pressing also compacts the web which lowers web thickness and resulting absorbency.

Through Air Drying (TAD) and Uncreped Through Air Drying (UCTAD) processes are Wet-Laid technologies that avoid compaction of the web during drying and thereby produce tissue and towel webs of superior thickness and absorbency when compared to structures of similar basis weight and material inputs that are produced using the CWP or CDC process. Patents which describe creped through air dried products include U.S. Pat. Nos. 3,994,771, 4,102,737, 4,191,609, 4,529,480, 467,859, and 5,510,002, while U.S. Pat. No. 5,607,551 describes an uncreped through air dried product.

The remaining Wet-Laid processes termed ATMOS, ETAD, NTT, STT and QRT can also be utilized to produce tissue and towel products. Each of these processes/methods utilizes some pressing to dewater the web, or a portion of the web, resulting in tissue or towel with bulk and absorbency that is greater than the CWP or CDC process but not to the level seen achieved using the TAD or UCTAD process. The ATMOS process and products are described in U.S. Pat. Nos. 7,744,726, 6,821,391, 7,387,706, 7,351,307, 7,951,269, 8,118,979, 8,440,055, 7,951,269 8,118,979, 8,440,055, 8,196,314, 8,402,673, 8,435,384, 8,544,184, 8,382,956, 8,580,083, 7,476,293, 7,510,631, 7,686,923, 7,931,781, 8,075,739, 8,092,652, 7,905,989, 7,582,187, and 7,691,230. The ETAD process and products are disclosed in U.S. Pat. Nos. 7,339,378, 7,442,278, and 7,494,563. The NTT process and products are disclosed in PCT publication WO 2009/061079 A1 and U.S. Patent Application Publication Nos. US 2011/0180223 A1 and US 2010/0065234 A1. The QRT process is disclosed in U.S. Patent Application Publication No. 2008/0156450 A1 and U.S. Pat. No. 7,811,418. The STT process is disclosed in U.S. Pat. No. 7,887,673.

To impart certain physical properties to the wet laid bath tissue, facial tissue, or towel web, different chemistries can be added during the paper making or converting process. These chemistries can be added to the tissue or towel web by mixing the chemistries with the pulp slurry prior to deposition of the nascent web onto a forming surface through the headbox of a wet laid papermaking machine. Alternately, chemistries can be applied to the nascent web on the papermaking machine via a spraying apparatus using air or water as a conveying media. In the case of water spray applications, most chemistries will need to be diluted to reduce the viscosity to a level which allows for droplet formation when being pumped through spray nozzles. This water must then be removed from the web during drying which results in increased energy costs. Additionally, the spray can disturb the formation of the web resulting in variation of physical properties.

Air atomized applications are also limited to low viscosity chemistries to enable atomization of the chemicals. The small size of atomized chemistry allows for pressure disturbences in the surrounding atmosphere to disturb the spray resulting in overspray and capture challenges.

Another application method uses a rotogravure roll to transfer the chemistry to the nascent web. Additionally, chemistries can be applied to the nascent web via the Yankee dryer which transfers applied chemistry to the paper web as the web with a layer of applied chemistry is creped from the Yankee dryer.

Use of a spraying apparatus or rotogravure roll can also be used to apply chemistry to the web after drying in the dry end of the paper machine or in the converting operation. For example, chemistry can be sprayed onto the calendars on the dry end of a paper machine and the web can be contacted with the calendar rolls to transfer the chemistry, or a rotogravure roll can be used to apply chemisty to the web in the converting operation. Using a roll to transfer chemistry can cause the web to stick to the transfer roll, disrupting production.

Many different types of chemistries are utilized on paper tissue and paper towels. To increase the softness of facial tissue and bath tissue, chemical debonding agents, lotions, moisturizers or softeners can be used, as disclosed in, for example, U.S. Pat. Nos. 5,246,545, 5,264,082, 5,334,286, 5,354,425, 5,385,642, 5,437,766, 5,494,731, 5,527,560, 5,981,044, 4,351,699, 4,441,962, 4,940,513, 5,240,562, 5,246,545, 5,405,501, 5,510,000, 5,698,076, 5,814,188, 5,846,380, 6,162,329, 6,179,961, 6,579416, 6,607,637, 6,797,117, 7,432,309, 5,575,891, 5,624,532, 6,179,961, 5,525,345, 5,624,676, 5,705,164, 5,716,692, 5,830,487, 6,238,682, 6,261,580, and 7,771,566. Examples of topical softeners include but are not limited to quaternary ammonium compounds, including, but not limited to, the dialkyldimethylammonium salts (e.g. ditallowdimethylammonium chloride, ditallowdimethylammonium methyl sulfate, di(hydrogenated tallow)dimethyl ammonium chloride, etc.). Another class of chemical softening agents include the well-known organo-reactive polydimethyl siloxane ingredients, including amino functional polydimethyl siloxane. zinc stearate, aluminum stearate, sodium stearate, calcium stearate, magnesium stearate, spermaceti, and steryl oil. Non-ionic surfactants can be used as softening agents as well such as ethylene oxide, propylene oxide adducts of fatty alcohols, alkylglycoside esters, ethoxylated vegetable oil, and alkylethoxylated esters. Ionic surfactants can also be used as softening agents such as 1,2-di(heptadecyl)-3-methyl-4,5-dihydroimidazol-3-ium methyl sulfate. Other exemplary ionic surfactants include (2-hydroxyethyl)methylbis[2-[(1-oxooctadecyl)oxy]ethyl]ammonium methyl sulfate, fatty dialkyl amine quaternary salts, mono fatty alkyl tertiary amine salts, unsaturated fatty alkyl amine salts, linear alkyl sulfonates, alkyl-benzene sulfonates and trimethyl-3-[(1-oxooctadecyl)amino]propylammonium methyl sulfate. Debonding quaternary amine compounds such as trimethyl cocoammonium chloride, trymethyloleylammonium chloride, dimethyldi(hydrogenated-tallow)ammonium chloride and trimethylstearylammonium chloride can be used to reduce strength of the bath tissue, facial tissue, or towel web for increased softness.

Chemistries to enhance the strength of tissue and towel products are also commonly applied in the art. These chemistries include polyvinylamine, glyoxalated polyacrylamide, starch (modified or unmodified), carboxy methyl cellulose, guar gum, locust bean gum, cationic polyacrylamide, polyvinyl alcohol, anionic polyacrylamide, ethylene vinyl acetate, alpha-olefin polymers with an ethylene-carboxylic acid copolymer, or size agents such as alkenylsuccinic anhydride or alkyl ketene dimers or rosin dispersion sizing.

Permanent wet strength binders are also applied such as polyamide-polyamine-epichlorohydrin, polyacrylamides, styrenebutadiene latexes; insolubilized polyvinyl alcohol; urea-formaldehyde; polyethyleneimine; chitosan polymers and mixtures thereof. Temporary wet strength binders can also be applied such as glyoxylated polyacrylamide or modified starch which can be made by reacting dimethoxyethyl-N-methyl-chloroacetamide with cationic starch polymers or glyoxalated polyacrylamides or mixtures thereof.

Chemistries which increase the absorbent capacity or absorbency rate of the tissue or paper towel web can be applied such as polyacrylate/polyacrylamide copolymers.

The application methods of these functional chemistries including mixing with the pulp slurry, spraying using air or water as a media, and transferring by direct contact using a rotogravure roll or Yankee dryer all result in a high amount of chemical waste. Addition of chemistry to the pulp slurry results in chemistry that does not bind with the fiber, but stays in the water of the paper making water system and is ultimately sent to waste water treatment. Chemicals applied via a spray system results in overspray and chemical waste. Application using a rotogravure roll makes it difficult to control chemical addition levels which can result in over-application and thus high levels of waste.

SUMMARY OF THE INVENTION

An object of the present invention is to provide a system and method of application of viscous chemistry to a web of bath tissue, facial tissue, or paper towel. The system and method uses an apparatus that includes a piezoelectric material to propel droplets of chemistry through a set of nozzles onto a traversing web of bath tissue, facial tissue, or paper towel.

A method of applying viscous chemistries to a paper product according to an exemplary embodiment of the present invention comprises: forming a paper web; and applying a viscous chemistry to the paper web with a piezoelectric device during a process for converting the paper web into a roll good.

In an exemplary embodiment the viscous chemistry comprises a solution, an emulsion, an ointment, a lotion or combinations thereof.

In an exemplary embodiment the viscous chemistry has a viscosity of 20 centipoise (cps) to 1,000 cps as measured by a Brookfield viscometer.

In an exemplary embodiment the viscous chemistry has a viscosity of 40 centipoise (cps) to 200 centipoise (cps) as measured by a Brookfield viscometer.

In an exemplary embodiment the step of applying a viscous chemistry comprises controlling droplet size of the viscous chemistry to 0.5 microns to 20 microns in diameter.

In an exemplary embodiment the step of applying a viscous chemistry comprises controlling a speed of formation of a droplet of the viscous chemistry to a maximum of 165,000 droplets per second.

In an exemplary embodiment the step of applying a viscous chemistry comprises controlling angle of deflection of droplets of the viscous chemistry.

In an exemplary embodiment the step of controlling angle of deflection comprises applying an electrostatic field to the droplets of viscous chemistry and passing the droplets through electrostatic deflection plates.

In an exemplary embodiment the step of applying a viscous chemistry comprises applying the viscous chemistry to the paper web in a pattern.

In an exemplary embodiment the step of applying a viscous chemistry comprises applying the viscous chemistry by an amount of 0.1 kg/ton to 10 kg/ton to the paper web.

In an exemplary embodiment the step of applying a viscous chemistry comprises applying the viscous chemistry by an amount of 0.1 kg/ton to about 5 kg/ton to the paper web.

In an exemplary embodiment the step of applying a viscous chemistry comprises applying the viscous chemistry by an amount of 0.1 kg/ton to about 2.5 kg/ton to the paper web.

In an exemplary embodiment the method further comprises the step of changing a temperature of the viscous chemistry before the step of applying.

In an exemplary embodiment the step of changing a temperature of the viscous chemistry comprises cooling the viscous chemistry.

In an exemplary embodiment the step of changing a temperature of the viscous chemistry comprises heating the viscous chemistry.

In an exemplary embodiment the paper product is a wet laid disposable bath tissue, facial tissue, or paper towel.

BRIEF DESCRIPTION OF THE DRAWINGS

The present invention will be better understood when read in conjunction with the appended drawings. It should be understood, however, that the invention is not limited to the precise arrangements shown. In the drawings.

DETAILED DESCRIPTION

Exemplary embodiments of the present invention are directed to systems and methods of applying chemistry to bath tissue, facial tissue and paper towel products using piezoelectric material.

In general, conventional piezoelectric printers include a piezoelectric material such as lead zirconate titanate or potassium sodium niobate behind nozzles on fluid (typically ink) filled chambers instead of a heating element. When a voltage is applied, the piezoelectric material changes shape, generating a pressure pulse in the fluid, which forces a droplet of ink from the nozzle. Limitations of conventional piezoelectric application devices include chemical viscosity limitations, chemical solids limitations, and chemical particle size limitations.

Figure 1:
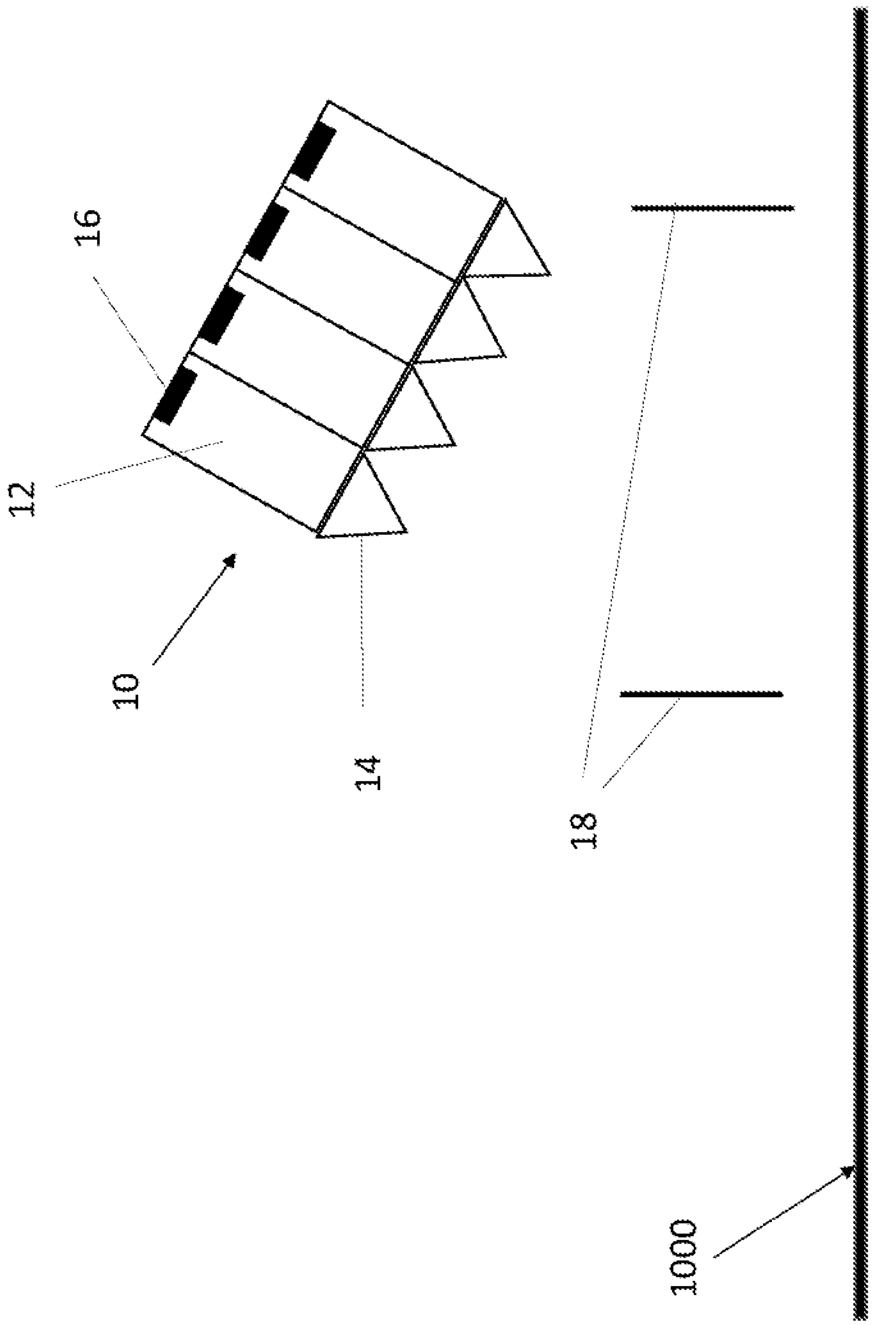
FIG. 1 shows a piezoelectric apparatus according to an exemplary embodiment of the present invention.
Figure 3:
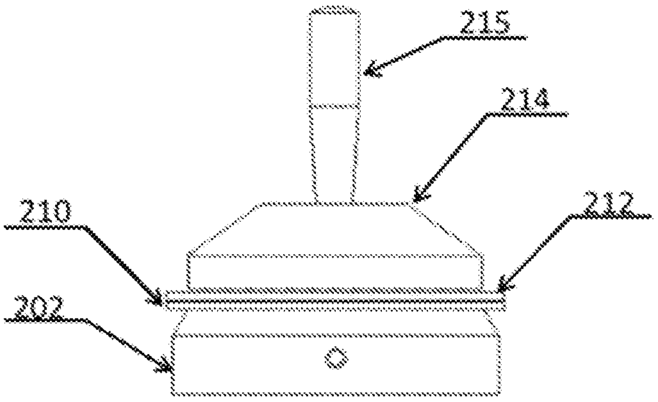
FIG. 3 shows a loading weight used in a wet scrubbing test.
Figure 2:
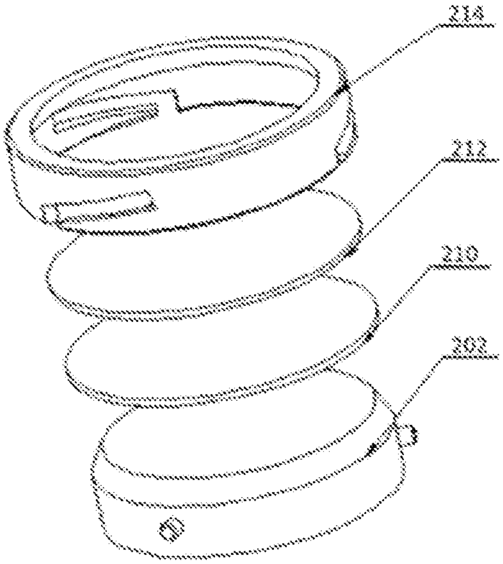
FIG. 2 shows an exploded view of the attachment of a towel sample to an abrading table as part of a wet scrubbing test.
Figure 4:
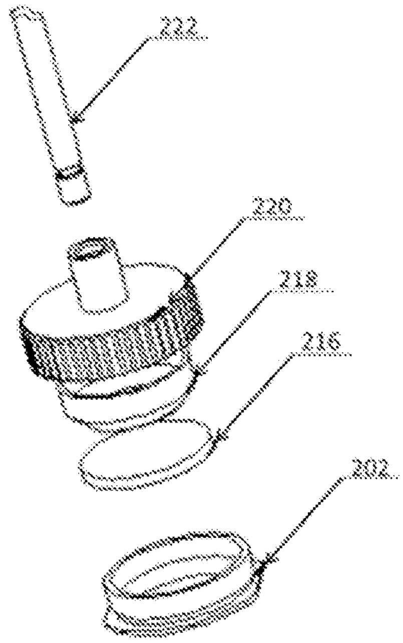
FIG. 4 shows a specimen holder used in a wet scrubbing test.

As shown in FIG. 1, in accordance with exemplary embodiments of the present invention, an apparatus 10 uses piezoelectric material to propel droplets of viscous chemistry through a set of nozzles 14 onto a traversing web of bath tissue, facial tissue, or paper towel 1000. As used herein, viscous chemistry means a solution, emulsion, ointment, lotion or the like having a viscosity of from about 20 centipoise (cps) to about 1,000 cps or from about 40 cps to about 200 cps as measured by a Brookfield viscometer.

Chambers 12 of the apparatus 10 are filled with the desired chemistry. A piezoelectric material 16 is disposed within each chamber, and the piezoelectric material 16 is electrically connected to a voltage source. In embodiments, the piezoelectric material may be disposed at the back of each chamber. The end of each chamber 12 extends out to a nozzle tip.

When voltage is applied, the piezoelectric material 16 changes shape, generating a pressure pulse in the chemical fluid which forces a droplet of chemistry from the nozzle across a gap to a traversing substrate such as bath tissue, facial tissue or paper towel 1000. In each nozzle 14, the droplet size can be controlled between, for example, approximately 0.5 microns up to 20 microns in diameter with the speed of droplet formation of, for example, up to 165,000 droplets per second by controlling various characteristics of the electrical charge applied to the piezoelectric material, such as, for example, voltage and/or frequency. In embodiments, the viscous chemistry droplets may be subjected to an electrostatic field created by a charging electrode as they form, with the field being varied according to the degree of drop deflection desired. This results in a controlled, variable electrostatic charge on each droplet. Charged droplets may be separated by one or more uncharged "guard droplets" to minimize electrostatic repulsion between neighbouring droplets.

The charged droplets may pass through another electrostatic field and are directed (deflected) by electrostatic deflection plates 18 to deposit on the tissue or towel substrate, or allowed to continue on undeflected to a collection gutter for re-use. The more highly charged droplets are deflected to a greater degree. The deflection of the droplets allows for the deposition of the chemistry to be applied in any pattern desired and thus the properties of the substrate can be controlled in a unique and directional manner. Suitable patterns include, for example, lines, wavy lines, dots, diamonds, triangles and the like, to name a few. Pattern applications can be used to control physical properties in the final converted multi-ply product. For example, machine direction ("MD") oriented patterns with less drops in the cross direction ("CD") orientation can reduce MD tensile over CD tensile loss. Highly oriented basesheets can be made square after paper drying. In another example, square tensile basesheets can become highly oriented by applying more surface surfactant in one orientation. An object of these methods is to match best consumer experience with lowest manufacturing cost (e.g., higher uptime, higher chemical retention, lower total cost, etc.).

The amount of chemistry applied to the web may vary depending on the application, and may generally range from about 0.1 kg/ton to about 10 kg/ton or from about 0.1 kg/ton to about 5 kg/ton or from about 0.1 kg/ton to about 2.5 kg/ton. Some chemistries may be applied at room temperature. Other chemistries may need to be heated before and during application. Suitable heating temperature may vary based on the chemistry, and may generally range from about 30° C. to about 100° C. The applied chemistry may be cooled before rolling the paper goods using, for example, fans and the like.

Test Methods

All testing is conducted on prepared samples that have been conditioned for a minimum of 2 hours in a conditioned room at a temperature of 23+−1.0 deg Celsius, and 50.0%+−2.0% Relative Humidity. The exceptions are softness testing which requires 24 hours of conditioning at 23+−1.0 deg Celsius, and 50.0%+−2.0% Relative Humidity and Lint testing which has a preconditioning step for 24 hours at a relative humidity level of 10 to 35% and within a temperature range of 22 to 40 deg C. before being conditioned for 24 hours at 23+−1.0 deg Celsius, and 50.0%+−2.0% Relative Humidity.

Ball Burst Testing

The Ball Burst of a 2-ply web was determined using a Tissue Softness Analyzer (TSA), available from emtec Electronic GmbH of Leipzig, Germany using a ball burst head and holder. The instrument is calibrated every year by an outside vendor according to the instrument manual. The balance on the TSA was verified and/or calibrated before burst analysis. The balance was zeroed once the burst adapter and testing ball (16 mm diameter) were attached to the TSA. The testing distance from the testing ball to the sample was calibrated. A 112.8 mm diameter circular punch was used to cut out five round samples from the web. One of the samples was loaded into the TSA, with the embossed surface facing up, over the holder and held into place using the ring. The ball burst algorithm "Berst Resistance" was selected from the list of available softness testing algorithms displayed by the TSA. The ball burst head was then pushed by the TSA through the sample until the web ruptured and calculated the force in Newtons required for the rupture to occur. The test process was repeated for the remaining samples and the results for all the samples were averaged then converted to grams force.

For more detailed description for operating the TSA, measuring ball burst, and calibration instructions refer to the "Leaflet Collection" or "Operating Instructions" manuals provided by emtec.

Wet Ball Burst Testing

The Wet Ball Burst of a 2-ply web was determined using a Tissue Softness Analyzer (TSA), available from emtec Electronic GmbH of Leipzig, Germany using a ball burst head and holder. The instrument is calibrated every year by an outside vendor according to the instrument manual. The balance on the TSA was verified and/or calibrated before burst analysis. The balance was zeroed once the burst adapter and testing ball (16 mm diameter) were attached to the TSA. The testing distance from the testing ball to the sample was calibrated. A 112.8 mm diameter circular punch was used to cut out five round samples from the web. One of the samples was loaded into the TSA, with the embossed surface facing up, over the holder and held into place using the ring. The ball burst algorithm “Berst Resistance” was selected from the list of available softness testing algorithms displayed by the TSA. One milliliter of water was placed onto the center of the sample using a pipette and 30 seconds was allowed to pass before beginning the measurement. The ball burst head was then pushed by the TSA through the sample until the web ruptured and calculated the force in Newtons required for the rupture to occur. The test process was repeated for the remaining samples and the results for all the samples were averaged then converted to grams force.

For more detailed description for operating the TSA, measuring ball burst, and calibration instructions refer to “Leaflet Collection” or “Operating Instructions” manuals provided by emtec.

Stretch & MD, CD, and Wet CD Tensile Strength Testing

A Thwing-Albert EJA series tensile tester, manufactured by Thwing Albert of West Berlin, NJ, an Instron 3343 tensile tester, manufactured by Instron of Norwood, MA, or other suitable vertical elongation tensile testers, which may be configured in various ways, typically using 1 inch or 3 inch wide strips of tissue or towel can be utilized. The instrument is calibrated every year by an outside vendor according to the instrument manual. Jaw separation speed and distance between jaws (clamps) is verified prior to use, and the balance “zero’ed”. A pre-tension or slack correction of 5 N/m must be met before elongation begins to be measured. After calibration, 6 strips of 2-ply product were cut using a 25.4 mm×120 mm die. When testing MD (Machine Direction) tensile strength, the strips were cut in the MD direction. When testing CD (Cross Machine Direction) tensile strength, the strips were cut in the CD direction. One of the sample strips was placed in between the upper jaw faces and clamped before carefully straightening (without straining the sample) and clamping the sample (hanging feely from the upper jaw) between the lower jaw faces with a gap or initial test span of 5.08 cm (2 inches). Using a jaw separation speed of 2 in/min, a test was run on the sample strip to obtain tensile strength and peak stretch (as defined by TAPPI T-581 om-17). The test procedure was repeated until all the samples were tested. The values obtained for the six sample strips were averaged to determine the tensile strength and peak stretch in the MD and CD direction. When testing CD wet tensile, the strips were placed in an oven at 105 degrees Celsius for 5 minutes and saturated with 75 microliters of deionized water at the center of the strip across the entire cross direction immediately prior to pulling the sample.

Basis Weight

Using a dye and press, six 76.2 mm by 76.2 mm square samples were cut from a 2-ply product being careful to avoid any web perforations. The samples were placed in an oven at 105 deg C. for a minimum of 3 minutes before being immediately weighed on an analytical balance to the fourth decimal point. The weight of the sample in grams was multiplied by 172.223 to determine the basis weight in grams/m$^2$. The samples were tested individually, and the results were averaged. The balance should be verified before use and calibrated every year by an outside vendor according to the instrument manual.

Caliper Testing

A Thwing-Albert ProGage 100 Thickness Tester Model 89-2012, manufactured by Thwing Albert of West Berlin, NJ was used for the caliper test. The instrument is verified before use and calibrated every year by an outside vendor according the instrument manual. The Thickness Tester was used with a 2 inch diameter pressure foot with a preset loading of 95 grams/square inch, a 0.030 inch/sec measuring speed, a dwell time of 3 seconds, and a dead weight of 298.45 g. Six (6) 100 mm×100 mm square samples were cut from a 2-ply product with the emboss pattern facing up. The samples were then tested individually, and the results were averaged to obtain a caliper result in microns.

Wet Caliper

A Thwing-Albert ProGage 100 Thickness Tester Model 89-2012, manufactured by Thwing Albert of West Berlin, NJ was used for the caliper test. The instrument is verified before use and calibrated every year by an outside vendor according the instrument manual. The Thickness Tester was used with a 2 inch diameter pressure foot with a preset loading of 95 grams/square inch, a 0.030 inch/sec measuring speed, a dwell time of 3 seconds, and a dead weight of 298.45 g. Six (6) 100 mm×100 mm square samples were cut from a 2-ply product with the emboss pattern facing up. Each sample was placed in a container that had been filled to a three inch level with deionized water. The container was large enough where the sample could be placed on top of the water without having to fold the sample. The sample sat in the water in the container for 30 seconds, before being removed and then tested for caliper using the ProGage. The samples were tested individually, and the results were averaged to obtain a wet caliper result in microns.

Softness Testing

Softness of a 2-ply web was determined using a Tissue Softness Analyzer (TSA), available from emtec Electronic GmbH of Leipzig, Germany. The TSA comprises a rotor with vertical blades which rotate on the test piece to apply a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB V$^2$ rms. The stiffness of the sample is also calculated as the device measures deformation of the sample under a defined load. The stiffness value (D) is expressed as mm/N. The device also calculates a Hand Feel (HF) number with the value corresponding to a softness as perceived when someone touches a sample by hand (the higher the HF number, the higher the softness). The HF number is a combination of the TS750, TS7, and stiffness of the sample measured by the TSA and calculated using an algorithm which also requires the caliper and basis weight of the sample. Different algorithms can be selected for different facial, toilet, and towel paper products. Before testing, a calibration check should be performed using “TSA Leaflet Collection No. 9” available from emtec. If the calibration check demonstrates a calibration is necessary, “TSA Leaflet Collection No. 10” is followed.

A 112.8 mm diameter round punch was used to cut out five samples from the web. One of the samples was loaded into the TSA, clamped into place (outward facing or embossed ply facing upward), and the TPII algorithm was selected from the list of available softness testing algorithms displayed by the TSA when testing bath tissue and the Facial II algorithm was selected when testing towel. After inputting parameters for the sample (including caliper and basis weight), the TSA measurement program was run. The test process was repeated for the remaining samples and the results for all the samples were averaged and the average HF number recorded.

For more detailed description for operating the TSA, measuring softness, and calibrations refer to the "Leaflet Collection" or "Operating Instructions" manuals provided by emtec.

Absorbency Testing

An M/K GATS (Gravimetric Absorption Testing System), manufactured by M/K Systems, Inc., of Peabody, MA, USA was used to test absorbency using MK Systems GATS Manual. The instrument is calibrated annually by an outside vendor according to the manual. Absorbency is reported as grams of water absorbed per gram of absorbent product. The following steps were followed during the absorbency testing procedure:

Turn on the computer and the GATS machine. The main power switch for the GATS is located on the left side of the front of the machine and a red light will be illuminated when power is on. Ensure the balance is on. A balance should not be used to measure masses for a least 15 minutes from the time it is turned on. Open the computer program by clicking on the "MK GATS" icon and click "Connect" once the program has loaded. If there are connectivity issues, make sure that the ports for the GATS and balance are correct. These can be seen in Full Operational Mode. The upper reservoir of the GATS needs to be filled with Deionized water. The Velmex slide level for the wetting stage was set at 6.5 cm. If the slide is not at the proper level, movement of it can only be accomplished in Full Operational Mode. Click the "Direct Mode" check box located in the top left of the screen to take the system out of Direct Mode and put into Full Operational Mode. The level of the wetting stage is adjusted in the third window down on the left side of the software screen. To move the slide up or down 1 cm at a time, the button for "1 cm up" and "1 cm down" can be used. If a millimeter adjustment is needed, press and hold the shift key while toggling the "1 cm up" or "1 cm down" icons. This will move the wetting stage 1 mm at a time. Click the "Test Options" Icon and ensure the following set-points are inputted: "Dip Start" selected with 10.0 mm inputted under "Absorption", "Total Weight change (g)" selected with 0.1 inputted under "Start At", Rate (g) selected with 0.05 inputted per (sec) 5 under "End At" on the left hand side of the screen, "Number of Raises" 1 inputted and regular raises (mm) 10 inputted under "Desorption", Rate (g) selected with −0.03 inputted per 5 sec under "End At" on the right hand side of the screen. The water level in the primary reservoir needs to be filled to the operational level before any series of testing. This involves the reservoir and water contained in it to be set to 580 grams total mass. Click on the "Setup" icon in the box located in the top left of the screen. The reservoir will need to be lifted to allow the balance to tare or zero itself. The feed and draw tubes for the system are located on the side and extend into the reservoir. Prior to lifting the reservoir, ensure that the top hatch on the balance is open to keep from damaging the top of the balance or the elevated platform that the sample is weighed on. Open the side door of the balance to lift the reservoir. Once the balance reading is stable a message will appear to place the reservoir again. Ensure that the reservoir doesn't make contact with the walls of the balance. Close the side door of the balance. The reservoir will need to be filled to obtain the mass of 580 g. Once the reservoir is full, the system will be ready for testing. The system is now ready to test. Obtain a minimum number of four 112.8 mm diameter circular samples. Three will be tested with one extra available. Enter the pertinent sample information in the "Enter Material ID." section of the software. The software will automatically date and number the samples as completed with any used entered data in the center of the file name. Click the "Run Test" icon. The balance will automatically zero itself. Place the pre-cut sample on the elevated platform, making sure the sample isn't in contact with the balance lid. Once the balance load is stabilized, click "Weigh". Move the sample to the wetting stage, centered with the emboss facing down. Ensure the sample doesn't touch the sides and place the cover on the sample. Click "Wet the Sample". The wetting stage will drop the preset distance to initiate absorption (10 mm). The absorption will end when the rate of absorption is less than 0.05 grams/5 seconds. When absorption stops, the wetting stage will rise to conduct desorption. Data for desorption isn't recorded for tested sample. Remove the saturated sample and dry the wetting stage prior to the next test. Once the test is complete, the system will automatically refill the reservoir. Record the data generated for this sample. The data that is traced for each sample is the dry weight of the sample (in grams), the normalized total absorption of the sample reflected in grams of water/gram of product, and the normalized absorption rate in grams of water per second. Repeat procedure for the three samples and report the average total absorbency.

Crumple Testing

Crumple of a 2-ply web was determined using a Tissue Softness Analyzer (TSA), available from EMTECH Electronic GmbH of Leipzig, Germany, using the crumple fixture and base. The instrument is calibrated every year by an outside vendor according to the instrument manual. The balance on the TSA was verified and/or calibrated before analysis. The balance was zeroed once the crumple adapter and head were attached to the TSA. The testing head distance to the sample was calibrated. A 68 mm diameter round punch was used to cut out five round samples from the web. One of the samples was loaded into the crumple base, clamped into place, and the crumple algorithm was selected from the list of available testing algorithms displayed by the TSA. After inputting parameters for the sample, the crumple measurement program was run. The test process was repeated for the remaining samples and the results for all the samples were averaged. Crumple force is measured in Newtons and then converted to grams force. Crumple force is a good measure of the flexibility or drape of the product.

For more detailed description for operating the TSA, measuring crumple-ability, and calibrations refer to the "Leaflet Collection" or "Operating Instructions" manuals provided by emtec.

Wet Scrub

A wet scrubbing test was used to measure the durability of a wet towel. The test involved scrubbing a sample wet towel with an abrasion tester and recording the number of revolutions of the tester it takes to break the sample. Multiple samples of the same product were tested and an average durability for that product was determined. The measured durability was then compared with similar durability measurements for other wet towel samples.

An abrasion tester was used for the wet scrubbing test. The particular abrasion tester that was used was an M235 Martindale Abrasion and Pilling Tester ("M235 tester") from SDL Atlas Textile Testing Solutions. The M235 tester provides multiple abrading tables on which the samples are abrasion tested and specimen holders that abrade the towel samples to enable multiple towel samples to be simultaneously tested. A motion plate is positioned above the abrading tables and moves the specimen holders proximate the abrasion tables to make the abrasions.

In preparation for the test, eight (8) towel samples, approximately 140 mm (about 5.51 inches) in diameter, were cut. Additionally, four (4) pieces, also approximately 140 mm (approximately 5.51 inches) in diameter, were cut from an approximately 82±1 μm thick non-textured polymer film. The non-textured side of a Ziploc® Vacuum Sealer bag from Johnson & Johnson was used as the non-textured polymer film. However, any non-textured polymer film, such as high density polyethylene (HDPE), low density polyethylene (LDPE), polypropylene (PP), or polyester, to name a few, could be used. Additionally, four (4) 38 mm diameter circular pieces were cut from a textured polymer film with protruding passages on the surface to provide roughness. The textured polymer film that is used for this test is the textured side of a Ziploc® Vacuum Sealer bag from Johnson & Johnson. The textured film has a square-shaped pattern (FIG. 8). The thickness of the protruding passages of the textured polymer film that are used are approximately 213±5 μm and the thickness of the film in the valley region of the textured film between the protruding passages are approximately 131±5 μm. The samples were cut using respective 140 mm diameter and 38 mm cutting dies and a clicker press.

Figure 5:
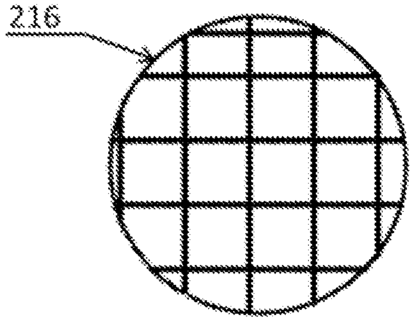
FIG. 5 shows a textured polymer film used in a wet scrubbing test.

An example of an abrading table used in conjunction with the M235 tester is shown in FIG. 5. FIG. 5 presents an exploded view of the attachment of a towel sample to an abrading table 202. To insert each sample to be tested in an abrading table, the motion plate 204 of an abrading table was removed from the tester, a clamp ring 214 was unscrewed, a piece of smooth polymer film 210 was placed on the abrading table 202, and a towel sample 212 was then placed on top of the smooth polymer film 210. A loading weight 215, shown in FIG. 6, was temporarily placed on top of the sample 212 on the abrading table 202 to hold everything in place while the clamp ring 214 was reattached to abrading table 202 to hold the towel sample 212 in place.

Referring to FIG. 7, for each abrading table 202 in the M235 tester, there is a corresponding specimen holder 206 to perform the abrasion testing. The specimen holder 206 was assembled by inserting a piece of the textured polymer film 216 within a specimen holder insert 218 that is placed beneath and held in place under a specimen holder body 220 with a specimen holder nut (not shown). A spindle 222 was mounted to the top center of the specimen holder body 206. A top view of the textured polymer film 216 of FIG. 7 is shown in FIG. 8.

The M235 tester was then turned on and set for a cycle time of 200 revolutions. 0.5 mL of water was placed on each towel sample. After a 30 second wait, the scrubbing test was initiated, thereby causing the specimen holder 206 to rotate 200 revolutions. The number of revolutions that it took to break each sample on the respective abrading table 202 (the "web scrubbing resistance" of the sample) was recorded. The results for the samples of each product were averaged and the products were then rated based on the averages.

Lint Testing

The amount of lint generated from a tissue product was determined with a Sutherland Rub Tester. This tester uses a motor to rub a weighted felt 5 times over the stationary tissue with a stroke speed of 42 strokes/min. The Hunter Color L value is measured before and after the rub test. The difference between these two Hunter Color L values is calculated as lint.

Lint Testing—Sample Preparation:

The Sutherland Rub Tester may be obtained from Testing Machines, Inc. (Amityville, N.Y. 11701). The tissue is first prepared by removing and discarding any product which might have been abraded in handling, e.g. on the outside of the roll. For multi-ply finished product, three sections with each containing two sheets of multi-ply product are removed and set on the bench-top. For single-ply product, six sections with each containing two sheets of single-ply product are removed and set on the bench-top. Each sample is then folded in half such that the crease is running along the cross direction (CD) of the tissue sample. For the multi-ply product, make sure one of the sides facing out is the same side facing out after the sample is folded. In other words, do not tear the plies apart from one another and rub test the sides facing one another on the inside of the product. For the single-ply product, make up 3 samples with the off-Yankee side out and 3 with the Yankee side out. Keep track of which samples are Yankee side out and which are off-Yankee side out.

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.5"×6". Puncture two holes into each of the six cards by forcing the cardboard onto the hold down pins of the Sutherland Rub tester.

If working with single-ply finished product, center and carefully place each of the 2.5"×6" cardboard pieces on top of the six previously folded samples. Make sure the 6" dimension of the cardboard is running parallel to the machine direction (MD) of each of the tissue samples. If working with multi-ply finished product, only three pieces of the 2.5"×6" cardboard will be required. Center and carefully place each of the cardboard pieces on top of the three previously folded samples. Once again, make sure the 6" dimension of the cardboard is running parallel to the machine direction (MD) of each of the tissue samples.

Fold one edge of the exposed portion of tissue sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the paper onto the board, tape this second edge to the back of the cardboard. Repeat this procedure for each sample.

Turn over each sample and tape the cross direction edge of the tissue paper to the cardboard. One half of the adhesive tape should contact the tissue paper while the other half is adhering to the cardboard. Repeat this procedure for each of the samples. If the tissue sample breaks, tears, or becomes frayed at any time during the course of this sample preparation procedure, discard and make up a new sample with a new tissue sample strip.

If working with multi-ply converted product, there will now be 3 samples on the cardboard. For single-ply finished product, there will now be 3 off-Yankee side out samples on cardboard and 3 Yankee side out samples on cardboard.

Lint Testing—Felt Preparation

Obtain a 30"×40" piece of Crescent #300 cardboard from Cordage Inc. (800 E. Ross Road, Cincinnati, Ohio, 45217). Using a paper cutter, cut out six pieces of cardboard of dimensions of 2.25"×7.25". Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25"×8.5"×0.0625. Place the felt on top of the unscored, green side of the cardboard such that the long edges of both the felt and cardboard are parallel and in alignment. Make sure the fluffy side of the felt is facing up. Also allow about 0.5" to overhang the top and bottom most edges of the cardboard. Snuggly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single tissue sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same tissue lot number is used for each of the 24 samples for the old and new lots. In addition, sampling of the paper in the preparation of the cardboard/tissue samples must be done so the new lot of felt and the old lot of felt are exposed to as representative as possible of a tissue sample. For the case of 1-ply tissue product, discard any product which might have been damaged or abraded. Next, obtain 48 strips of tissue each two usable units (also termed sheets) long. Place the first two usable unit strip on the far left of the lab bench and the last of the 48 samples on the far right of the bench. Mark the sample to the far left with the number “1” in a 1 cm by 1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest. Now, mark the lowest number for each set with a letter “Y.” Mark the next highest number with the letter “O.” Continue marking the samples in this alternating “Y”/“O” pattern. Use the “Y” samples for Yankee side out lint analyses and the “O” samples for off-Yankee side lint analyses. For 1-ply product, there are now a total of 24 samples for the new lot of felt and the old lot of felt. Of this 24, twelve are for Yankee side out lint analysis and 12 are for off-Yankee side lint analysis.

Rub and measure the Hunter Color L values for all 24 samples of the old felt as described below. Record the 12 Yankee side Hunter Color L values for the old felt. Average the 12 values. Record the 12 off-Yankee side Hunter Color L values for the old felt. Average the 12 values. Subtract the average initial un-rubbed Hunter Color L felt reading from the average Hunter Color L reading for the Yankee side rubbed samples. This is the delta average difference for the Yankee side samples. Subtract the average initial un-rubbed Hunter Color L felt reading from the average Hunter Color L reading for the off-Yankee side rubbed samples. This is the delta average difference for the off-Yankee side samples. Calculate the sum of the delta average difference for the Yankee-side and the delta average difference for the off-Yankee side and divide this sum by 2. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Record the 12 Yankee side Hunter Color L values for the new felt. Average the 12 values. Record the 12 off-Yankee side Hunter Color L values for the new felt. Average the 12 values. Subtract the average initial un-rubbed Hunter Color L felt reading from the average Hunter Color L reading for the Yankee side rubbed samples. This is the delta average difference for the Yankee side samples. Subtract the average initial un-rubbed Hunter Color L felt reading from the average Hunter Color L reading for the off-Yankee side rubbed samples. This is the delta average difference for the off-Yankee side samples. Calculate the sum of the delta average difference for the Yankee-side and the delta average difference for the off-Yankee side and divide this sum by 2. This is the uncorrected lint value for the new felt.

Take the difference between the corrected Lint Value from the old felt and the uncorrected lint value for the new felt. This difference is the felt correction factor for the new lot of felt.

Adding this felt correction factor to the uncorrected lint value for the new felt should be identical to the corrected Lint Value for the old felt.

The same type procedure is applied to two-ply tissue product with 24 samples run for the old felt and 24 run for the new felt. But, only the consumer used outside layers of the plies are rub tested. As noted above, make sure the samples are prepared such that a representative sample is obtained for the old and new felts.

Lint Testing—Care of 4 Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off When not in use, the weight must be positioned such that the pads are not supporting the full weight of the weight. It is best to store the weight on its side.

Lint Testing—Rub Tester Instrument Calibration

The Sutherland Rub Tester must first be calibrated prior to use. First, turn on the Sutherland Rub Tester by moving the tester switch to the “cont” position. When the tester arm is in its position closest to the user, turn the tester’s switch to the “auto” position. Set the tester to run 5 strokes by moving the pointer arm on the large dial to the “five” position setting. One stroke is a single and complete forward and reverse motion of the weight. The end of the rubbing block should be in the position closest to the operator at the beginning and at the end of each test.

Prepare a tissue paper on cardboard sample as described above. In addition, prepare a felt on cardboard sample as described above. Both of these samples will be used for calibration of the instrument and will not be used in the acquisition of data for the actual samples.

Place this calibration tissue sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface. Activate the tester by depressing the "push" button.

Keep a count of the number of strokes and observe and make a mental note of the starting and stopping position of the felt covered weight in relationship to the sample. If the total number of strokes is five and if the end of the felt covered weight closest to the operator is over the cardboard of the tissue sample at the beginning and end of this test, the tester is calibrated and ready to use. If the total number of strokes is not five or if the end of the felt covered weight closest to the operator is over the actual paper tissue sample either at the beginning or end of the test, repeat this calibration procedure until 5 strokes are counted the end of the felt covered weight closest to the operator is situated over the cardboard at the both the start and end of the test.

During the actual testing of samples, monitor and observe the stroke count and the starting and stopping point of the felt covered weight. Recalibrate when necessary.

Lint Testing—Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary.

Place the white standard plate on the sample stage under the instrument port. Release the sample stage and allow the sample plate to be raised beneath the sample port.

Using the "L-Y","a-X", and "b-Z" standardizing knobs, adjust the instrument to read the Standard White Plate Values of "L", "a", and "b" when the "L", "a", and "b" push buttons are depressed in turn.

Lint Testing—Measurement of Samples

The first step in the measurement of lint is to measure the Hunter color values of the black felt/cardboard samples prior to being rubbed on the tissue. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual tissue paper/cardboard combinations, place the tissue sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the tissue sample. If torn, discard the felt and tissue and start over. If the tissue sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples.

After all tissues have been measured, remove and discard all felt. Felts strips are not used again. Cardboards are used until they are bent, torn, limp, or no longer have a smooth surface.

Lint Testing—Calculations

Determine the delta L values by subtracting the average initial L reading found for the unused felts from each of the measured values for the off-Yankee and Yankee sides of the sample. Recall, multi-ply-ply product will only rub one side of the paper. Thus, three delta L values will be obtained for the multi-ply product. Average the three delta L values and subtract the felt factor from this final average. This final result is termed the lint for the fabric side of the 2-ply product.

For the single-ply product where both Yankee side and off-Yankee side measurements are obtained, subtract the average initial L reading found for the unused felts from each of the three Yankee side L readings and each of the three off-Yankee side L readings. Calculate the average delta for the three Yankee side values. Calculate the average delta for the three fabric side values. Subtract the felt factor from each of these averages. The final results are termed a lint for the fabric side and a lint for the Yankee side of the single-ply product. By taking the average of these two values, an ultimate lint value is obtained for the entire single-ply product The following Examples are for illustrative purposes.

All Examples provided herein are performed on TAD bath tissue paper produced with a M-weave TAD fabric.

Example 1

A piezoelectric application device, 48PL, that is capable of depositing chemistry with a viscosity range of up to 200 cps was purchased from Alchemie Technology Ltd, Future Business Centre, Kings Hedges Road, Cambridge, CB4 2QT, UK T: 44 1223 781 286. The device was made up of two 121 mm 48PL coating heads each with 48 nozzles, with the coating heads disposed one in front of the other. The device was installed on a roll bath tissue converting line and operated at 24 Volts and 185.19 Hertz. The chamber was filled with ethoxylated vegetable oil softener chemistry having a viscosity of 100 cps. The softener was continuously and evenly applied with no pattern to the tissue traveling at 100 m/min as the tissue was converted to rolls. The application device overcame viscosity challenges with earlier piezoelectric devices that limited viscosity to 1-5 cps. It also overcame the viscosity limitations of standard fluid spray and eliminated the need of dilution to control the viscosity and provide the hydrolic force to drive the standard spray boom. The 2-ply tissue with applied softener had the following quality attributes: basis weight 37.5 g/m^2, caliper 440 microns, MD tensile of 125 N/m, MD stretch of 10.8%, CD tensile of 71 N/m, CD stretch of 6.8%, a handfeel softness of 92.8 with a TS7 value of 9.17 dB $V^2$ rms, a TS750 of 24.7 dB $V^2$ rms, and a D value of 2.74 mm/N, a ball burst of 210 gf, and a lint value of 6.43. An untreated roll of the same tissue without applied surface chemistry was produced with a basis weight of 38.3 g/m^2, a caliper of 441 microns, a MD tensile of 154 N/m, an MD stretch of 11%, a CD tensile of 85 N/m, a CD stretch of 7.6%, a handfeel softness of 90.6 with a TS7 value of 9.82 dB $V^2$ rms, a TS750 of 24.2 dB $V^2$ rms and a D value of 2.61 mm/N, a ball burst of 249 gf, and a lint value of 6.14.

Example 2

The device of Example 1 was installed on a roll bath tissue converting line and operated at 24 Volts and 185.19 Hertz. The chamber was filled with ethoxylated vegetable oil softener chemistry having a viscosity of 100 cps. The softener was applied with a CD line pattern to the tissue traveling at 100 m/min as the tissue was converted to rolls. The pattern was applied to adjust tensile ratio. CD lines were used to lower MD tensile more than CD. The application device overcame viscosity challenges with earlier piezoelectric devices that limited viscosity to 1-5 cps. It also overcame the viscosity limitations of standard fluid spray and eliminated the need of dilution to control the viscosity and provide the hydraulic force to drive the standard spray boom. The 2-ply tissue with applied softener had the following quality attributes: basis weight 37.5 g/m^2, caliper 440 microns, MD tensile of 110 N/m, MD stretch of 10.5%, CD tensile of 80 N/m, CD stretch of 6.8%, a handfeel softness of 93.5 with a TS7 value of 9.01 dB $V^2$ rms, a TS750 of 20.5 dB $V^2$ rms, and a D value of 2.84, a ball burst of 215 gf, and a lint value of 6.35. An untreated roll of the same tissue without applied surface chemistry was produced with a basis weight of 38.3 g/m^2, a caliper of 441 microns, a MD tensile of 154 N/m, an MD stretch of 11%, a CD tensile of 85 N/m, a CD stretch of 7.6%, a handfeel softness of 90.6 with a TS7 value of 9.82 dB $V^2$ rms, a TS750 of 24.2 dB $V^2$ rms and a D value of 2.61, a ball burst of 249 gf, and a lint value of 6.14.

Example 3

The device of Example 1 was installed on a roll bath tissue converting line and operated at 24 Volts and 185.19 Hertz. The chamber was filled with ethoxylated vegetable oil softener chemistry having a viscosity of 100 cps. The softener was applied with MD line patterns to the tissue traveling at 100 m/min as the tissue was converted to rolls. The application device overcame viscosity challenges with earlier piezoelectric devices that limited viscosity to 1-5 cps. It also overcame the viscosity limitations of standard fluid spray and eliminated the need of dilution to control the viscosity and provide the hydrolic force to drive the standard spray boom. The 2-ply tissue with applied softener had the following quality attributes: basis weight 37.5 g/m^2, caliper 443 microns, MD tensile of 145 N/m, MD stretch of 10.8%, CD tensile of 52 N/m, CD stretch of 6.8%, a handfeel softness of 93.8 with a TS7 value of 9.02 dB $V^2$ rms, a TS750 of 22.7 dB $V^2$ rms, and a D value of 2.94, a ball burst of 194 gf, and a lint value of 5.90. An untreated roll of the same tissue without applied surface chemistry was produced with a basis weight of 38.3 g/m^2, a caliper of 441 microns, a MD tensile of 154 N/m, an MD stretch of 11%, a CD tensile of 85 N/m, a CD stretch of 7.6%, a handfeel softness of 90.6 with a TS7 value of 9.82 dB $V^2$ rms, a TS750 of 24.2 dB $V^2$ rms and a D value of 2.61, a ball burst of 249 gf, and a lint value of 6.14.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

We claim:

1. A method of applying chemistries to a paper product comprising:

forming a paper web on a papermaking machine; and applying a chemistry in a pattern directly to the paper web while the paper web is moving through a paper converting line with a piezoelectric device during a process for converting the paper web into a roll good, wherein the chemistry has a viscosity of 20 centipoise (cps) to 1,000 cps as measured by a Brookfield viscometer, and wherein the paper product is a wet laid disposable bath tissue, facial tissue or paper towel.

2. The method of claim 1, wherein the chemistry comprises a solution, an emulsion, an ointment, a lotion or combinations thereof.

3. The method of claim 1, wherein the chemistry has a viscosity of 40 centipoise (cps) to 200 centipoise (cps) as measured by a Brookfield viscometer.

4. The method of claim 1, wherein the step of applying a chemistry comprises controlling droplet size of the chemistry to 0.5 microns to 20 microns in diameter.

5. The method of claim 1, wherein the step of applying a chemistry comprises controlling a speed of formation of a droplet of the chemistry to a maximum of 165,000 droplets per second.

6. The method of claim 1, wherein the step of applying a chemistry comprises controlling angle of deflection of droplets of the chemistry.

7. The method of claim 1, wherein the step of controlling angle of deflection comprises applying an electrostatic field to the droplets of chemistry and passing the droplets through electrostatic deflection plates.

8. The method of claim 1, wherein the step of applying a chemistry comprises applying the chemistry by an amount of 0.1 kg/ton to 10 kg/ton to the paper web.

9. The method of claim 1, wherein the step of applying a chemistry comprises applying the chemistry by an amount of 0.1 kg/ton to about 5 kg/ton to the paper web.

10. The method of claim 1, wherein the step of applying a chemistry comprises applying the chemistry by an amount of 0.1 kg/ton to about 2.5 kg/ton to the paper web.

11. The method of claim 1, further comprising the step of changing a temperature of the chemistry before the step of applying.

12. The method of claim 1, wherein the step of changing a temperature of the chemistry comprises cooling the chemistry.

13. The method of claim 1, wherein the step of changing a temperature of the chemistry comprises heating the chemistry.

* * * * *